US012384228B2

(12) United States Patent
Koreishi et al.

(10) Patent No.: US 12,384,228 B2
(45) Date of Patent: Aug. 12, 2025

(54) VEHICLE CABIN PARTITION STRUCTURE

(71) Applicant: TOYOTA JIDOSHA KABUSHIKI KAISHA, Toyota (JP)

(72) Inventors: Norimasa Koreishi, Miyoshi (JP); Hideo Takeda, Hekinan (JP); Hitoshi Takezoe, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 18/127,058

(22) Filed: Mar. 28, 2023

(65) Prior Publication Data

US 2023/0311623 A1   Oct. 5, 2023

(30) Foreign Application Priority Data

Mar. 30, 2022   (JP) ................................ 2022-054935

(51) Int. Cl.
*B60N 2/005* (2006.01)
*B60J 1/00* (2006.01)
*B62D 25/04* (2006.01)

(52) U.S. Cl.
CPC .............. *B60J 1/004* (2013.01); *B60N 2/005* (2013.01); *B62D 25/04* (2013.01)

(58) Field of Classification Search
CPC ........... B60J 1/004; B60J 1/006; B60N 2/005; B60N 2/015; B60N 2/242; B60N 2/68; B62D 25/04; B62D 65/02; B62D 65/06; B62D 65/14

USPC ......... 296/201, 193.06, 178, 193.01, 193.05, 296/203.03, 205, 63
See application file for complete search history.

(56) References Cited

U.S. PATENT DOCUMENTS

| 3,944,201 A | * | 3/1976 | Tantlinger | B60N 2/242 297/282 |
| 2014/0346825 A1 | * | 11/2014 | Mill | B60N 2/245 297/331 |
| 2021/0009021 A1 | | 1/2021 | Nakai | |

FOREIGN PATENT DOCUMENTS

JP   2021-011232 A   2/2021

* cited by examiner

*Primary Examiner* — Amy R Weisberg
*Assistant Examiner* — Wenwei Zhuo
(74) *Attorney, Agent, or Firm* — Dinsmore & Shohl LLP

(57) ABSTRACT

The window frame member has a horizontal bar shape, disposed between the upper window panel and the lower window panel and supports a lower end of the upper window panel and an upper end of the lower window panel. The window frame member has opposite longitudinal ends fixed to a B pillar and a C pillar, vertical pillars of the vehicle cabin, respectively. The seat cross member also has opposite longitudinal ends fixed to the B pillar and the C pillar. The window frame member and the seat cross member overlap each other at least partially in a portion along a vehicle height, and extend with a horizontal gap disposed therebetween over their entire lengths. The horizontal gap is less than a horizontal width of each of the window frame member and the seat cross member.

3 Claims, 9 Drawing Sheets

VEHICLE CABIN PARTITION STRUCTURE

CROSS REFERENCE TO RELATED APPLICATION

This application claims priority to Japanese Patent Application No. 2022-054935, filed on Mar. 30, 2022, which is incorporated herein by reference in its entirety including the specification, claims, drawings, and abstract.

TECHNICAL FIELD

The specification discloses a vehicle cabin partition structure.

BACKGROUND

Vehicles commonly include standing (vertical) partitions defining the inside and outside of a vehicle cabin. Vehicles commonly also include one or more seats within the vehicle cabin. JP 2021-11232 A, for example, discloses a passenger vehicle, such as a bus, including seats installed on a partition (side wall). More specifically, the vehicle includes, as vehicle frame members, a plurality of vertical column members, also referred to as pillars, standing along the length of the vehicle, and the partition is disposed between these pillars. A seat cross member or a frame member that supports the seats has opposite ends that are fixed to a pair of adjacent pillars, and the seats are attached to the seat cross member.

To enhance the outer appearance design of a vehicle, the partition that separates the inside and outside of the vehicle cabin may be composed of a glass or resin window panel. A plurality of such window panels may be disposed vertically, for example, rather than disposing a single elongated window panel covering the entire length of the partition.

A vertically-separated window panel structure as described above may also include a window frame member between a pair of window panels arranged vertically, to support edges of these window panels. For example, this window frame member is secured to a pair of adjacent pillars at its opposite ends.

While the objects supported by the seat cross member and the window frame member, the seats and the window panels, are not the same, these members have a common function to support objects and a common configuration of being secured to a pair of adjacent pillars at opposite ends. Therefore, disposing an integral frame member composed of the seat cross member and the window frame member may be considered. Such an integral frame member, however, may bend upon receiving a load from a passenger sitting on the seat and this bending may further result in deformation of the window panels supported by the integral frame member.

Meanwhile, the structure including the seat cross member and the window frame member that are vertically spaced from each other along the partition may require vertically separate upper and lower trim panels or interior members covering the respective members. Such a structure would increase costs as compared to the structure including the seat cross member and the window frame member adjacent to each other.

The specification therefore discloses a vehicle cabin partition structure that enables the window frame member and the seat cross member to be arranged collectively and in a well-organized manner while reducing transmission to the window frame member of the load input to the seat cross member.

SUMMARY

The specification discloses a vehicle cabin partition structure. The vehicle cabin partition structure includes a window panel, a window frame member, a seat, and a seat cross member. The window panel stands vertically to be part of a partition that separates the inside and outside of a vehicle cabin. The window frame member supports the window panel. The seat is disposed within the vehicle cabin and has a rear surface facing the window panel. The seat cross member is a frame member that supports the seat. The window panel includes an upper window panel and a lower window panel disposed below the upper window panel. The window frame member has a horizontal bar shape and is disposed between the upper window panel and the lower window panel and supports a lower end of the upper window panel and an upper end of the lower window panel. The window frame member has opposite longitudinal ends fixed to a first pillar and a second pillar adjacent to the first pillar, respectively. The first pillar and the second pillar are vertical pillars in the vehicle cabin. The seat cross member also has opposite longitudinal ends fixed to the first pillar and the second pillar, respectively. The window frame member and the seat cross member at least partially overlap each other in a portion along a vehicle height, and the window frame member and the seat cross member extend with a horizontal gap disposed between the window frame member and the seat cross member over entire lengths of the window frame member and the seat cross member. The horizontal gap is less than a horizontal width of the window frame member and a horizontal width of the seat cross member.

The above configuration enables the window frame member and the seat cross member to be arranged horizontally with a small gap that is less than the horizontal width of each of the window frame member and the seat cross member, and extend over their entire lengths in this state. This configuration including the window frame member and the seat cross member arranged horizontally with a small gap between them enables a single trim panel to cover both members. The non-contact state of the window frame member and the seat cross member over their entire lengths further prevents transmission of the load from the seat cross member to the window frame member.

In the above configuration, the opposite ends of the window frame member may be directly fixed to the first pillar and the second pillar. The opposite ends of the seat cross member may be fixed, via a bracket, to the first pillar and the second pillar.

The above configuration enables adjustment of the gap width between the window frame member and the seat cross member with the bracket.

In the above configuration, the window frame member and the seat cross member may be disposed in sequence from the window panel toward inward of the vehicle cabin. In this case, the window frame member includes an outer window frame member and an inner window frame member. The outer window frame member is disposed further outward relative to the inner window frame member within the vehicle cabin and the inner window frame member is disposed further inward relative to the outer window frame member within the vehicle cabin. The inner window frame member has a hat-shape cross section and includes a body part having a U-shape cross section and opened outward of the vehicle cabin and a pair of flanges extending upward and downward, respectively, from open ends of the body part. The seat cross member has a rectangular pipe shape. The bracket has a U-shape cross section and is opened outward of the vehicle cabin. The bracket includes a storage slot that receives, from inward of the vehicle cabin, the seat cross member and the body part of the inner window frame member. The storage slot has open ends in contact with the pair of flanges of the inner window frame member, respectively. In this configuration, a slot depth of the storage slot is greater than a sum of the horizontal width of the seat cross member and the horizontal width of the body part of the inner window frame member.

The above configuration enables adjustment of the gap width between the seat cross member and the inner window frame member to equal the difference between the depth of the storage slot and the sum of the horizontal width of the seat cross member and the horizontal width of the body part of the inner window frame member. In other words, the depth of the storage slot of the bracket can be used to control the gap width between the seat cross member and the window frame member.

The vehicle cabin partition structure according to the present disclosure enables the window frame member and the seat cross member to be arranged collectively in a well-organized manner and also enables prevention of transmission to the window frame member of the load input to the seat cross member.

BRIEF DESCRIPTION OF DRAWINGS

Embodiments of the present disclosure will be described based on the following figures, wherein.

DESCRIPTION OF EMBODIMENTS

Figure 1:
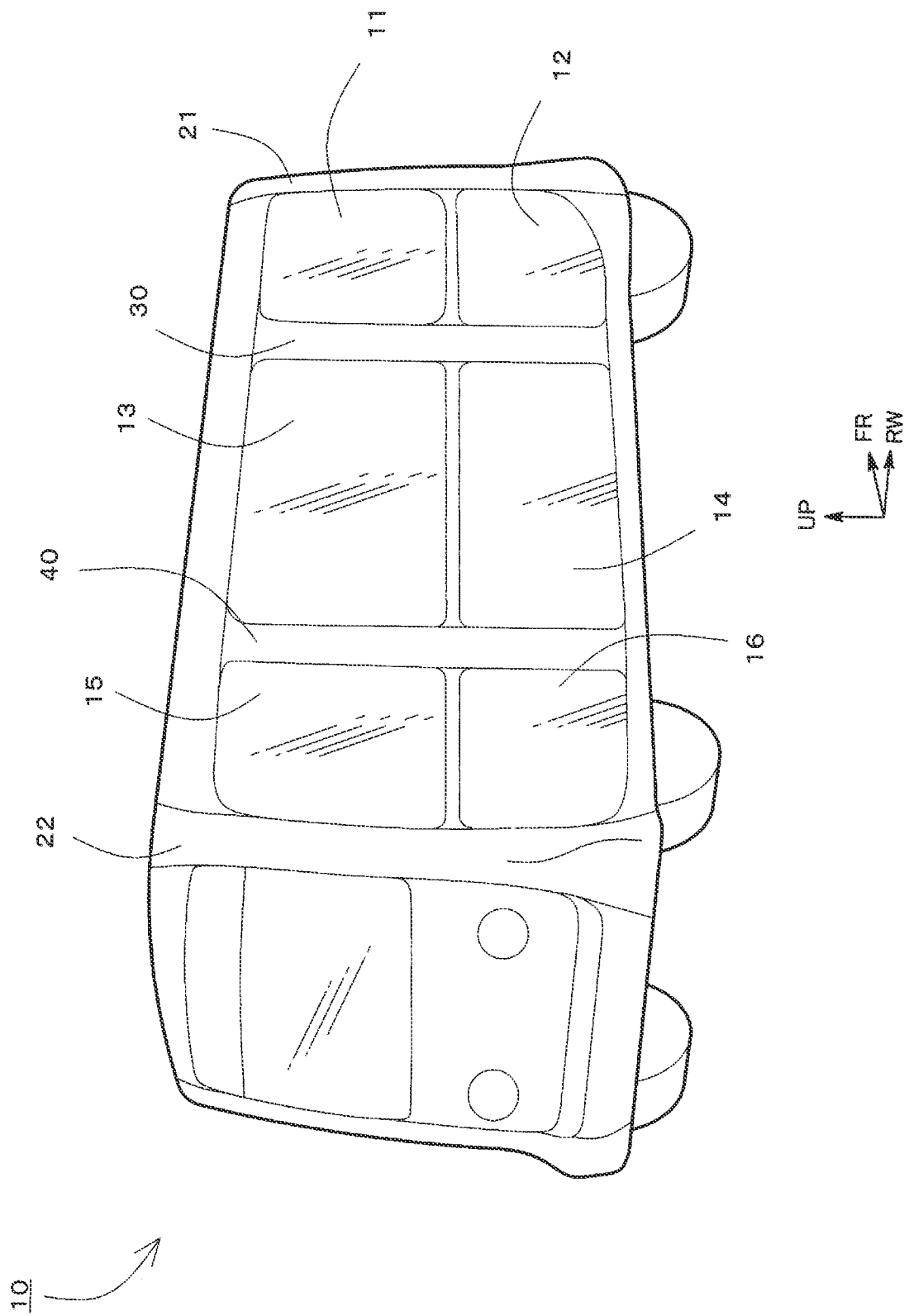
FIG. 1 is a perspective view illustrating the outer appearance of a vehicle including a vehicle cabin partition structure according to the present embodiment.

The vehicle cabin partition structure according to an embodiment will be described by reference to the drawings. In the following description, shapes, materials, the numbers of elements, and numeral values are examples for explanation purpose and may be changed as appropriate in accordance with the specification of the vehicle cabin partition structure. In the following, similar elements are denoted with corresponding reference numerals in all drawings.

In FIGS. 1 to 9, to indicate positions and direction of configurations, an orthogonal coordinate system including an FR axis, an RW axis, and an UP axis is employed. The FR axis indicates the vehicle length direction with the vehicle frontward direction being positive; the RW axis indicates the vehicle width direction with the vehicle rightward direction being positive; and the UP axis indicates the vehicle height direction with the upward direction being positive.

Based on this orthogonal coordinate system, an FR-RW plane is a horizontal plane. The horizontal plane is not limited to a vertical plane to the vertical axis, but includes a plane having, with respect to the vertical plane, an angular difference (angle error) within the dimensional tolerance that is set in the vehicle assembling process.

As will be described below, the vehicle cabin partition structure according to the embodiment includes on-vehicle equipment including an upper window panel 13, a lower window panel 14, and a seat 50 having a rear surface that is disposed facing these window panels (see FIG. 2). The vehicle cabin partition structure further includes a support structure for the on-vehicle equipment, including a window frame member 60 that supports the upper window panel 13 and the lower window panel 14 and a seat cross member 70 that supports the seat 50.

As illustrated, the entire length of the window frame member 60 and the entire length of the seat cross member 70 are disposed with a horizontal interval W1 (along the vehicle width direction) between the window frame member 60 and the seat cross member 70. This spaced arrangement reduces transmission of the load input to the seat cross member 70, such as a twist load generated upon passenger's sitting on the seat), to the window frame member 60. The setting structure of the window frame member 60 and the seat cross member 70 will be described in detail below.

Vehicle Outer Appearance

FIG. 1 illustrates the outer appearance of a vehicle 10 including the vehicle cabin partition structure according to the embodiment. Referring to the orthogonal coordinate system illustrated in FIG. 1, the sheet surface shows a right side and a rear side of the vehicle 10. The vehicle 10 is a passenger vehicle such as a bus. The vehicle 10 includes an entrance, for example, on the left side of the vehicle which is not shown.

The vehicle 10 includes a plurality of standing window panels as part of a partition that separates between inside and outside of the vehicle cabin. The window panels are arranged along the vehicle length and the vehicle height, for example. For example, upper window panels 11, 13, and 15 located in a relatively upper region are arranged along the vehicle length. Lower window panels 12, 14, and 16 are further arranged below the upper window panels 11, 13, and 15 along the vehicle length.

Each of the upper window panels 11, 13, and 15 and each of the lower window panels 12, 14, and 16 is disposed between a pair of pillars or vertical columns of the vehicle cabin. For example, the vehicle 10 includes an A pillar 21, a B pillar 30 (first pillar), a C pillar 40 (second pillar), and a D pillar 22 sequentially from the front toward the rear of the vehicle.

The upper window panel 11 and the lower window panel 12 are disposed between the A pillar 21 and the B pillar 30; the upper window panel 13 and the lower window panel 14 are disposed between the B pillar 30 (first pillar) and the C pillar 40 (second pillar); and the upper window panel 15 and the lower window panel 16 are disposed between the C pillar 40 and the D pillar 22.

The upper window panels 11, 13, and 15 and the lower window panels 12, 14, and 16 are composed of glass panels or resin panels. Both the upper window panels 11, 13, and 15 and the lower window panels 12, 14, and 16 may have a rectangular panel shape.

Support Structure of Window Panels

Four sides of each of the upper window panels 11, 13, and 15 and the lower window panels 12, 14, and 16 are supported by frame structures of the vehicle body. For example, the upper window panel 13 disposed at the center along the vehicle length is supported, at its upper end, by a roof rail (not shown) of the vehicle body and is supported, at its front and rear ends, by the B pillar 30 (first pillar) and the C pillar 40 (second pillar), respectively. Further, the upper window panel 13 is supported, at its lower end, by the window frame member 60, as illustrated in FIG. 8 which will be described below.

The lower window panel 14 disposed at the center along the vehicle length is supported, at its lower end, by a rocker panel (not shown) of the vehicle body, and is supported, at its front and rear ends, by the B pillar 30 (first pillar) and the C pillar 40 (second pillar), respectively. Further, the lower window panel 14 is supported, at is upper end, by the window frame member 60, as illustrated in FIG. 8 which will be described below.

Figure 2:
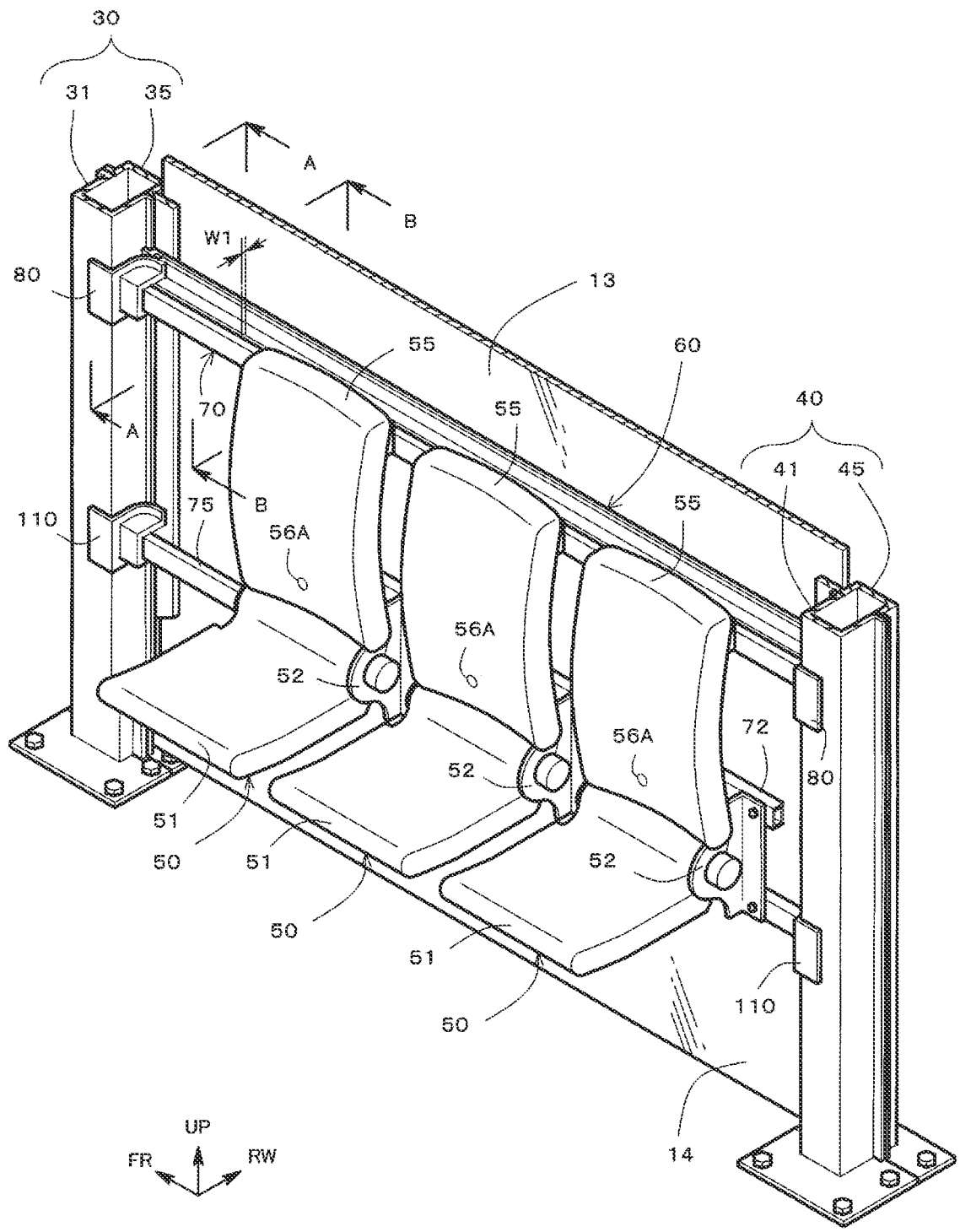
FIG. 2 is a perspective view illustrating the arrangement of window panels and seats within the vehicle cabin.

Referring to FIG. 2, the window frame member 60 is part of a rectangular frame that supports the upper window panel 13 and the lower window panel 14 having a rectangular shape, and has a horizontal bar shape extending along the vehicle length. Opposite longitudinal ends of the window frame member 60 are fixed to the B pillar 30 (first pillar) and the C pillar 40 (second pillar) adjacent to the B pillar 30, respectively, with a fixing structure which will be described below.

Figure 8:
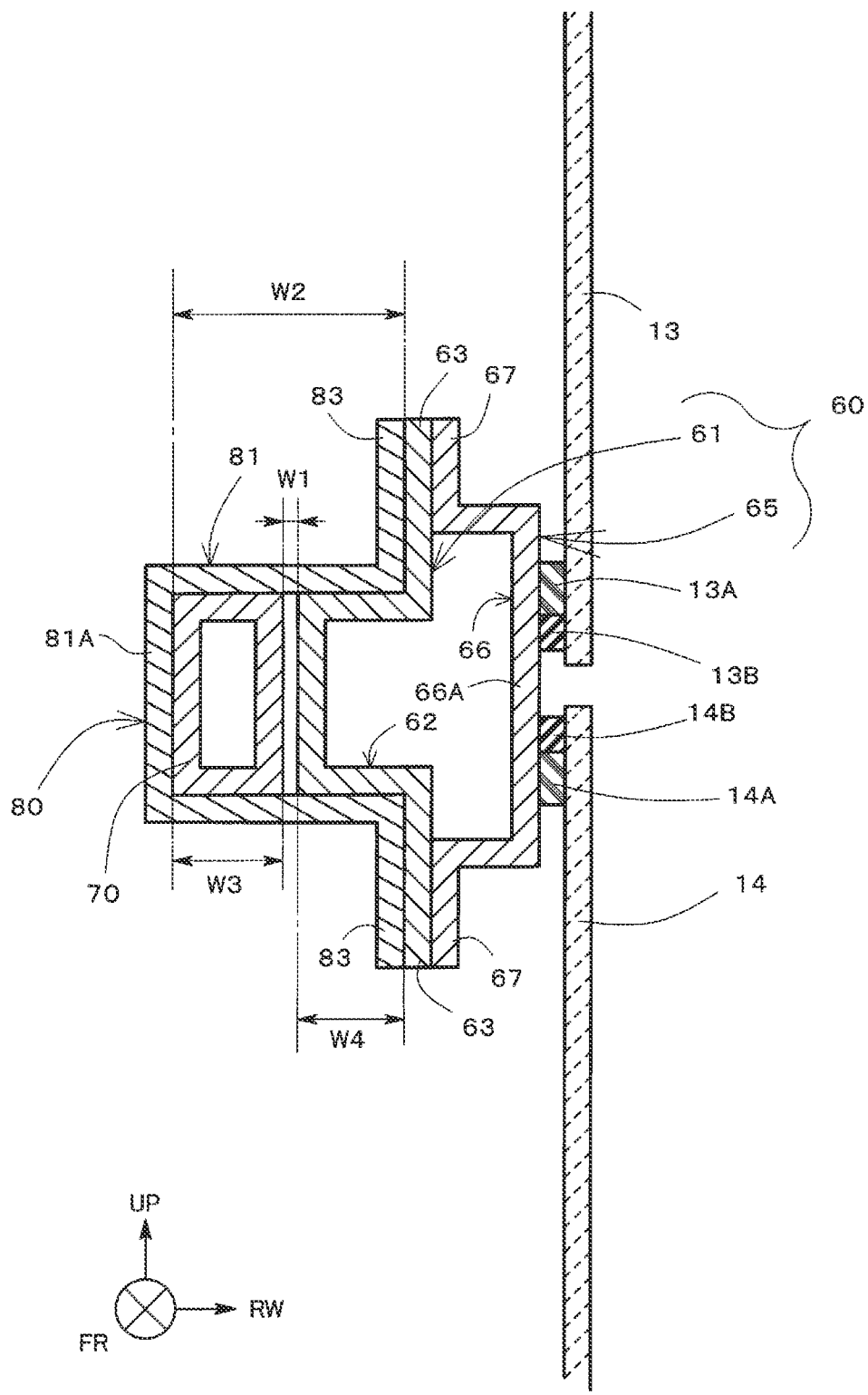
FIG. 8 illustrates an end surface of the cross section of FIG. 7.

Referring to FIG. 8, the window frame member 60 is disposed between the upper window panel 13 and the lower window panel 14 to support the lower end of the upper window panel 13 and the upper end of the lower window panel 14. The window frame member 60 has a closed sectional structure, and is composed of a pair of separate pieces, for example. Specifically, the window frame member 60 includes an inner window frame member 61 and an outer window frame member 65. The inner window frame member 61 is disposed further inward with respect to the outer window frame member 65 in the vehicle cabin, and the outer window frame member 65 disposed further outward with respect to the inner window frame member 61 in the vehicle cabin.

The inner window frame member 61 and the outer window frame member 65 both have a hat-shape cross section, and are abutted against each other at their openings to thereby form a closed sectional structure.

Specifically, the inner window frame member 61 has a U-shape cross section and includes a body part 62 opened outward of the vehicle cabin and a pair of flanges 63 extending upward and downward, respectively, from respective open ends of the body part 62.

The outer window frame member 65 similarly has a U-shape cross section and includes a body part 66 opened inward of the vehicle cabin and a pair of flanges 67 extending upward and downward, respectively, from respective open ends of the body part 66. The flanges 63 and 67 are joined by welding, for example, to thereby form a closed section structure.

A side portion 66A, which is a panel portion disposed outward in the vehicle width direction, of the body part 66 of the outer window frame member 65 faces the lower end portion of the upper window panel 13 and the upper end portion of the lower window panel 14. An adhesion layer 13A and a seal layer 13B are disposed between the side portion 66A and the upper window panel 13, and an adhesion layer 14A and a seal layer 14B are disposed between the side portion 66A and the lower window panel 14. The adhesion layers 13A and 14A bond or fix the upper window panel 13 and the lower window panel 14 to the outer window frame member 65.

As illustrated in FIG. 8, for example, the window frame member 60 and the seat cross member 70 overlap each other at least partially at portions along the vehicle height or along the vertical direction. In the example illustrated in FIG. 8, the center position of the window frame member 60 aligns with the height of the seat cross member 70.

As described above, the positions of the window frame member 60 and the seat cross member 70 are aligned along the vehicle height. This configuration increases flexibility for storage of these members as compared to a configuration without such alignment, and therefore allows a single trim panel that is an interior member, for example, to cover both the window frame member 60 and the seat cross member 70.

Figure 9:
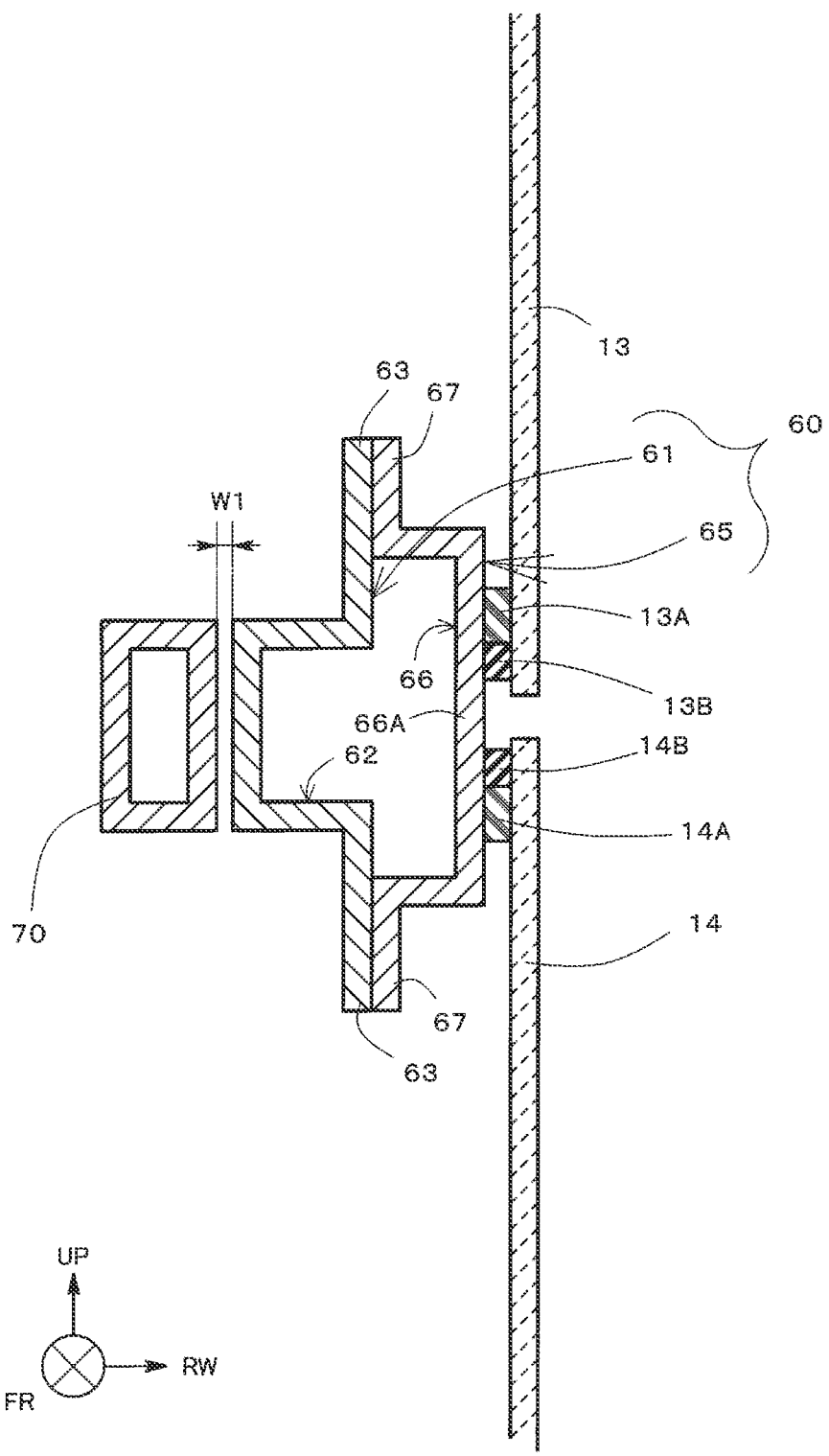
FIG. 9 illustrates a B-B cross section (end surface of the cross section) in FIG. 2.

As further illustrated in FIGS. 8 and 9, the body part 62 of the window frame member 60 and the seat cross member 70 have an equal height. Here, "equal" includes having a dimensional difference within the dimensional tolerance provided at the time of manufacturing. Configuring the window frame member 60 and the seat cross member 70 whose positions are aligned along the vehicle height and the body part 62 of the window frame member 60 and the seat cross member 70 at an equal height enables neat storage of the body part 62 of the window frame member 60 and the seat cross member 70 within a storage slot 81 of a pillar bracket 80.

Seat and Seat Support Structure

Figure 3:
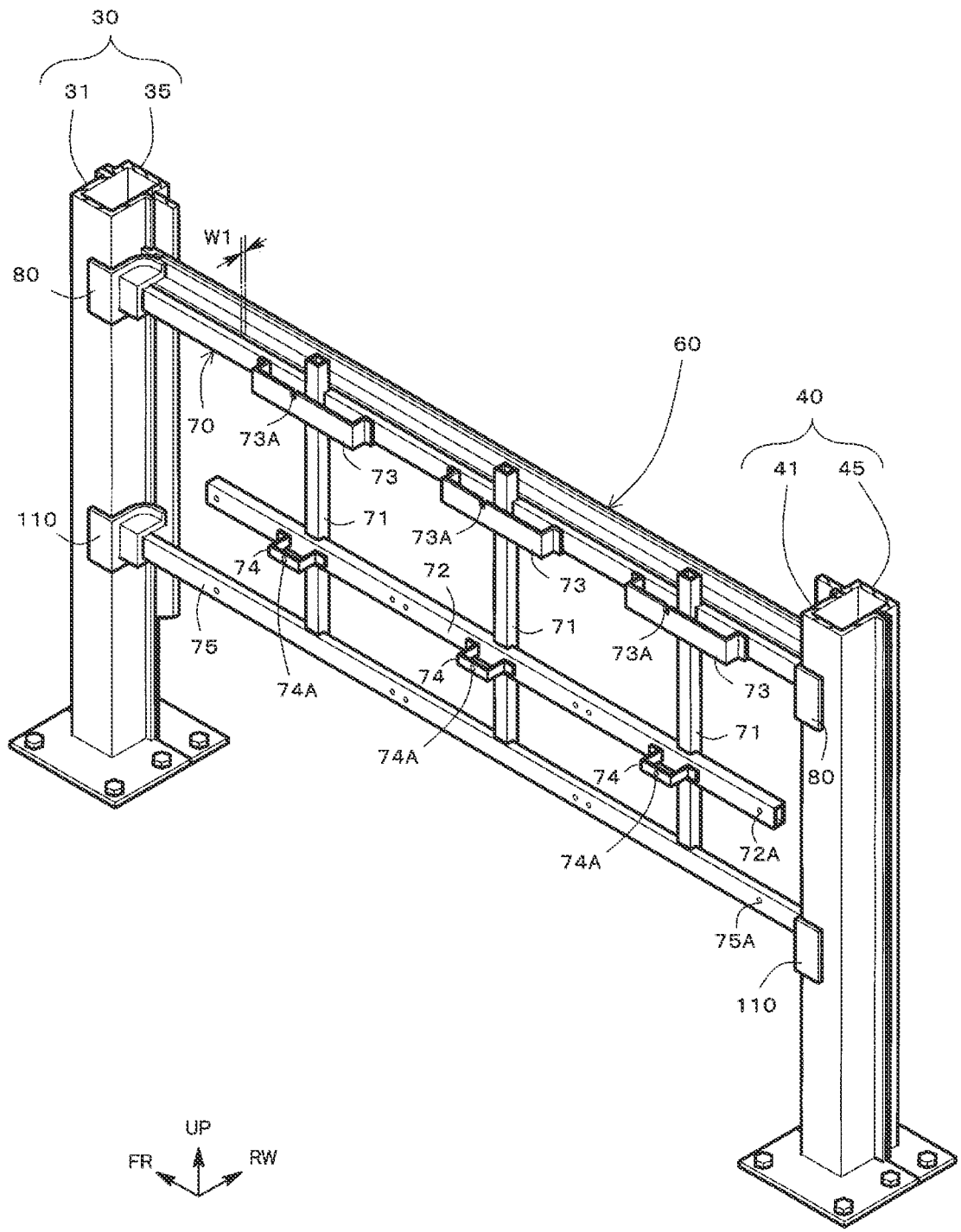
FIG. 3 is a perspective view illustrating a frame structure in FIG. 2 with the seats and the window panels being removed.

FIG. 2 illustrates the seat 50 disposed within the vehicle cabin, and FIG. 3 illustrates a support structure (frame) supporting the seat 50. In the illustrated example, the vehicle cabin includes three seats 50 between the B pillar 30 (first pillar) and the C pillar 40 (second pillar).

The seat 50 includes a seat cushion 51 that is a seat portion and a seat back 55 or a backrest. The rear surface of the seat back 55 is opposite the upper window panel 13 and the lower window panel 14. The seat cushion 51 is coupled, via a cushion bracket 52, with a seat beam 72 and the seat cross member 75. The seat cushion 51 is of a flip-up type and is rotatable vertically about the cushion bracket 52 as a rotation shaft.

Referring to FIG. 3, the vehicle cabin includes frame members for supporting the seat 50, including the seat cross members 70, 75, the seat beam 72, and a seat post 71. An upper bracket 73, a lower bracket 74, and the cushion bracket 52 (see FIG. 2) are attached to the frame members.

The seat cross members 70 and 75 are spaced from each other along the vehicle height or vertically. Referring to FIG. 8, each of the seat cross members 70 and 75 has, for example, a hollow rectangular shape, and has opposite longitudinal ends fixed to the B pillar 30 (first pillar) and the C pillar 40 (second pillar) illustrated in FIG. 3, respectively. The seat cross member 70 is disposed relatively upward with respect to the seat cross member 75. Specifically, the seat cross member 70 is fixed, via the pillar bracket 80, to the B pillar 30 (first pillar) and the C pillar 40 (second pillar), and the seat cross member 75 disposed relatively downward with respect to the seat cross member 70 is fixed, via a pillar bracket 110, to the B pillar 30 and the C pillar 40.

As illustrated FIGS. 8 and 9, for example, the window frame member 60 and the seat cross member 70 are sequentially disposed in this order from the upper window panel 13 and the lower window panel 14 toward inward of the vehicle cabin. The window frame member 60 and the seat cross member 70 are spaced from each other horizontally (along the vehicle width) with the gap W1 between them. This spaced arrangement allows the window frame member 60 to be fixed directly to the B pillar 30 (first pillar) and the C pillar 40 (second pillar), and the seat cross member 70 to be fixed via the pillar bracket 80 to the B pillar 30 and the C pillar 40. This fixing structure will be described in detail below.

Referring to FIG. 3, the seat post 71 and the seat beam 72 are disposed between the seat cross members 70 and 75. The seat post 71 is a vertical rod member, and the seat posts 71 in the number corresponding to the number of seats 50 are disposed between the seat cross members 70 and 75. In the example illustrated in FIG. 3, for example, three seat posts 71 are disposed at equal intervals along the vehicle length. The seat post 71 is welded to the seat cross member 70 at its upper end and is welded to the seat cross member 75 at is lower end.

The seat beam 72 that is a horizontal rod member extends across the plurality of seat posts 71. The seat beam 72 is not in contact with the B pillar 30 or the C pillar 40, and has a longitudinal size that is shorter than an interval between the two pillars, for example.

An upper bracket 73 is attached to the seat cross member 70 such that the upper bracket 73 bridges over the upper end of the seat post 71. A lower bracket 74 is attached to the seat beam 72 such that the lower bracket 74 bridges over the seat post 71.

Figure 4:
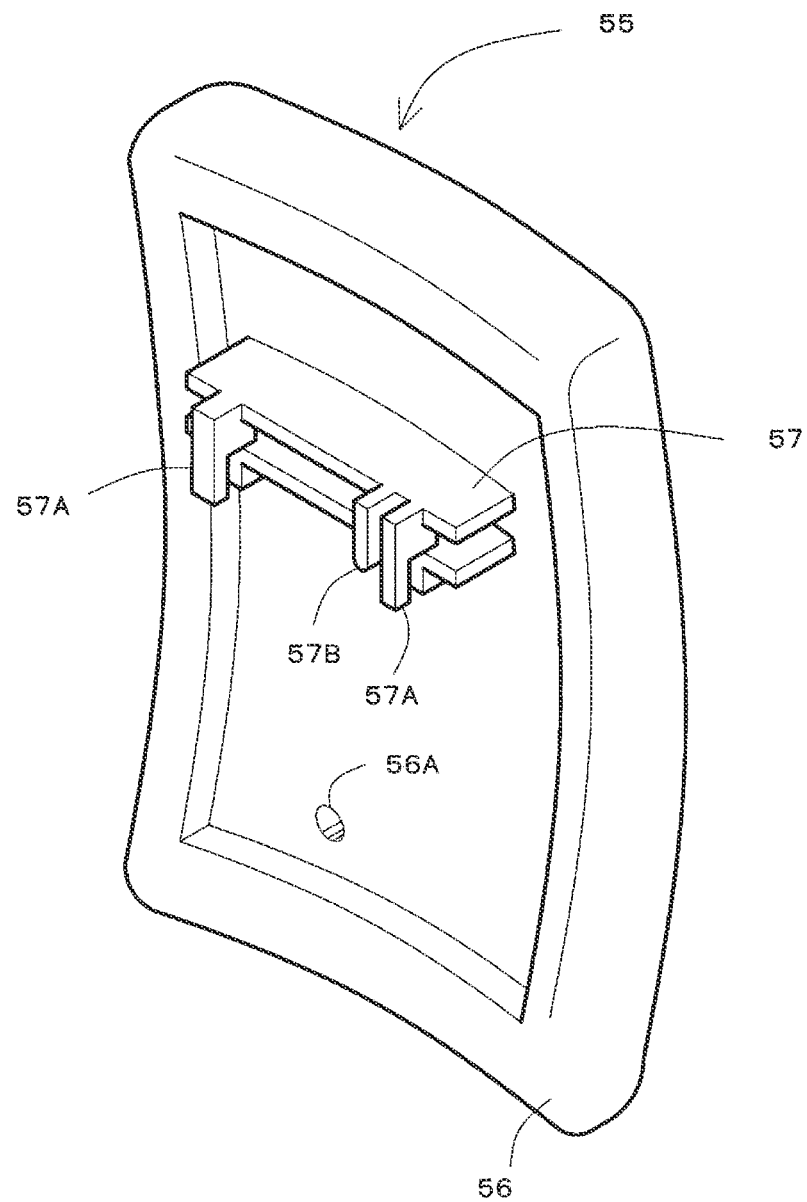
FIG. 4 is a perspective view illustrating a rear face structure of a seat back.

FIG. 4 illustrates the rear surface of the seat back 55. The seat back 55 is composed of two components; a back panel 56 and a support plate 57 disposed on an upper portion of the back panel 56. The support plate 57 includes, on its rear end, an engaging hook 57A and an alignment pin 57B. The back panel 56 includes, on its lower portion, a through hole 56A extending through the back panel 56 in the thickness direction.

Referring to FIG. 2 to FIG. 4, the engaging hook 57A is hooked onto the upper bracket 73. At this time, the alignment pin 57B of the support plate 57 (see FIG. 4) is fitted in a notch 73A of the upper bracket 73.

Fitting the alignment pin 57B in the notch 73A of the upper bracket 73 allows the through hole 56A of the seat back to be aligned with a through hole 74A of the lower bracket 74. A bolt is then screwed into these through holes to secure the seat back 55 to the lower bracket 74.

Referring to FIGS. 2 and 3, the seat cushion 51 and the cushion bracket 52 are previously integrated into an assembly, for example. For example, the cushion brackets 52 are attached to respective opposite sides of the seat cushion 51. Clamp holes (not shown) disposed on top and bottom of the cushion bracket 52 are aligned with a clamp holes 72A of the seat beam 72 and a clamp hole 75A of the seat cross member 75, respectively, and then the cushion bracket 52 is clamped to the seat beam 72 and the seat cross member 75 using bolts and nuts.

The vehicle 10 may further include a handrail (not shown) in the vicinity of the seats 50. In this configuration, the handrail is secured to the seat cross member 70 and is not attached to the window frame member 60. This configuration including the window frame member 60 and the handrail in noncontact with each other prevents transmission of the load input from the handrail to the upper window panel 13 and the lower window panel 14.

Coupling Structure of Seat Cross Member and Window Frame Member to Pillar

FIGS. 5 to 8 illustrate a coupling structure that couples the seat cross member 70 and the window frame member 60 to the B pillar 30 (first pillar) in the vehicle cabin partition structure according to the present embodiment. Due to the symmetrical configuration of the vehicle structure, a coupling structure that couples the seat cross member 70 and the window frame member 60 to the C pillar 40 (second pillar) has a structure similar to that illustrated in FIGS. 5 to 9.

The opposite ends of the window frame member 60 are directly fixed to the B pillar 30 and the C pillar 40, respectively. Meanwhile, the opposite ends of the seat cross member 70 are fixed, via the pillar bracket 80, to the B pillar 30 and the C pillar 40, respectively. Referring to FIGS. 8 and 9, because of this different fixing manners, the window frame member 60 and the seat cross member 70 extend with the horizontal gap W1 therebetween along their entire longitudinal lengths. As will be described below, the gap W1 is determined to be shorter than both a horizontal width W4 or a length along the vehicle width direction of the body part 62 (see FIG. 8) of the window frame member 60 and a horizontal width W3 or a length along the vehicle width direction of the seat cross member 70.

Figure 5:
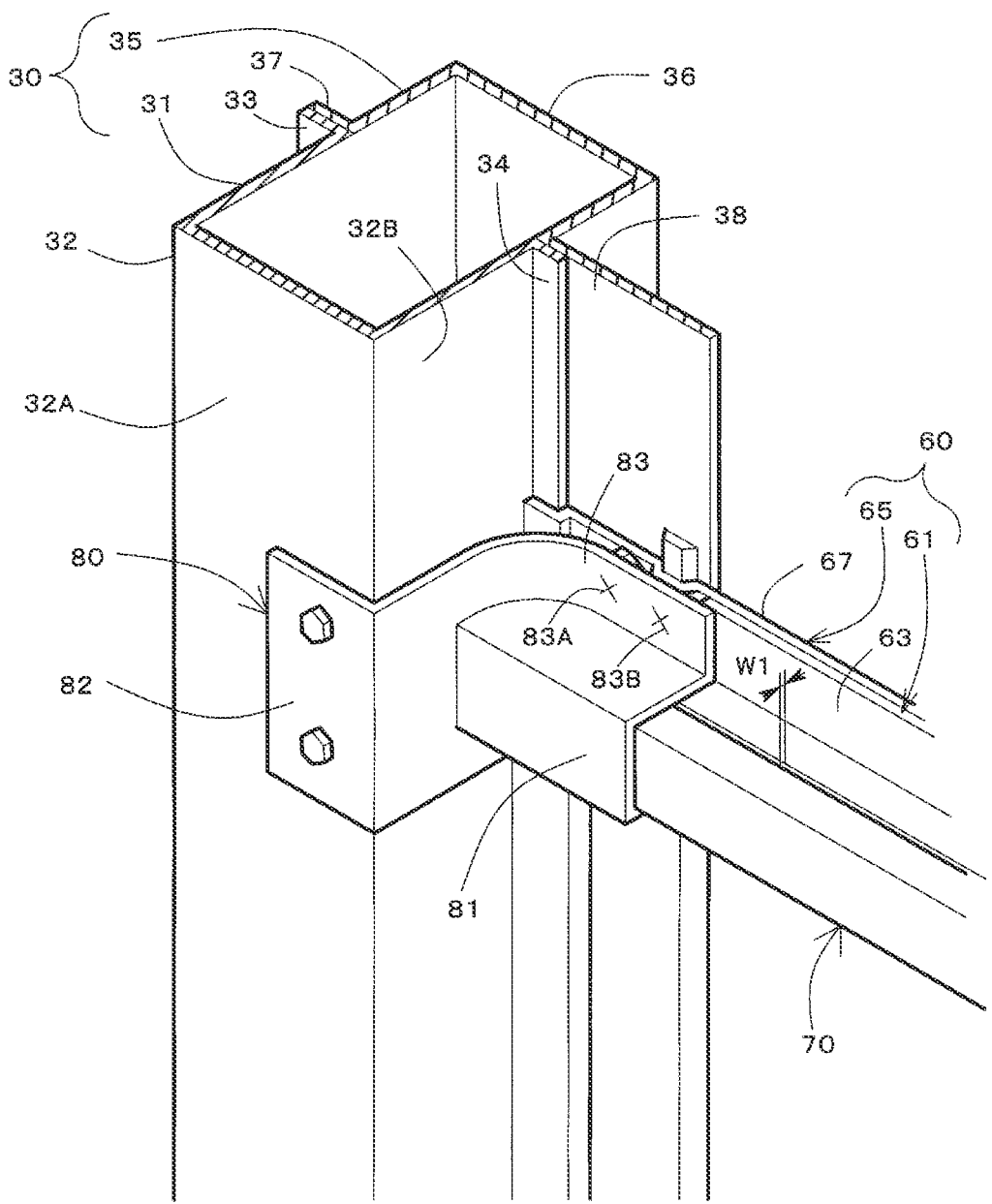
FIG. 5 is a perspective view illustrating a coupling structure in which the seat cross member and the window frame member are coupled to a first pillar.
Figure 6:
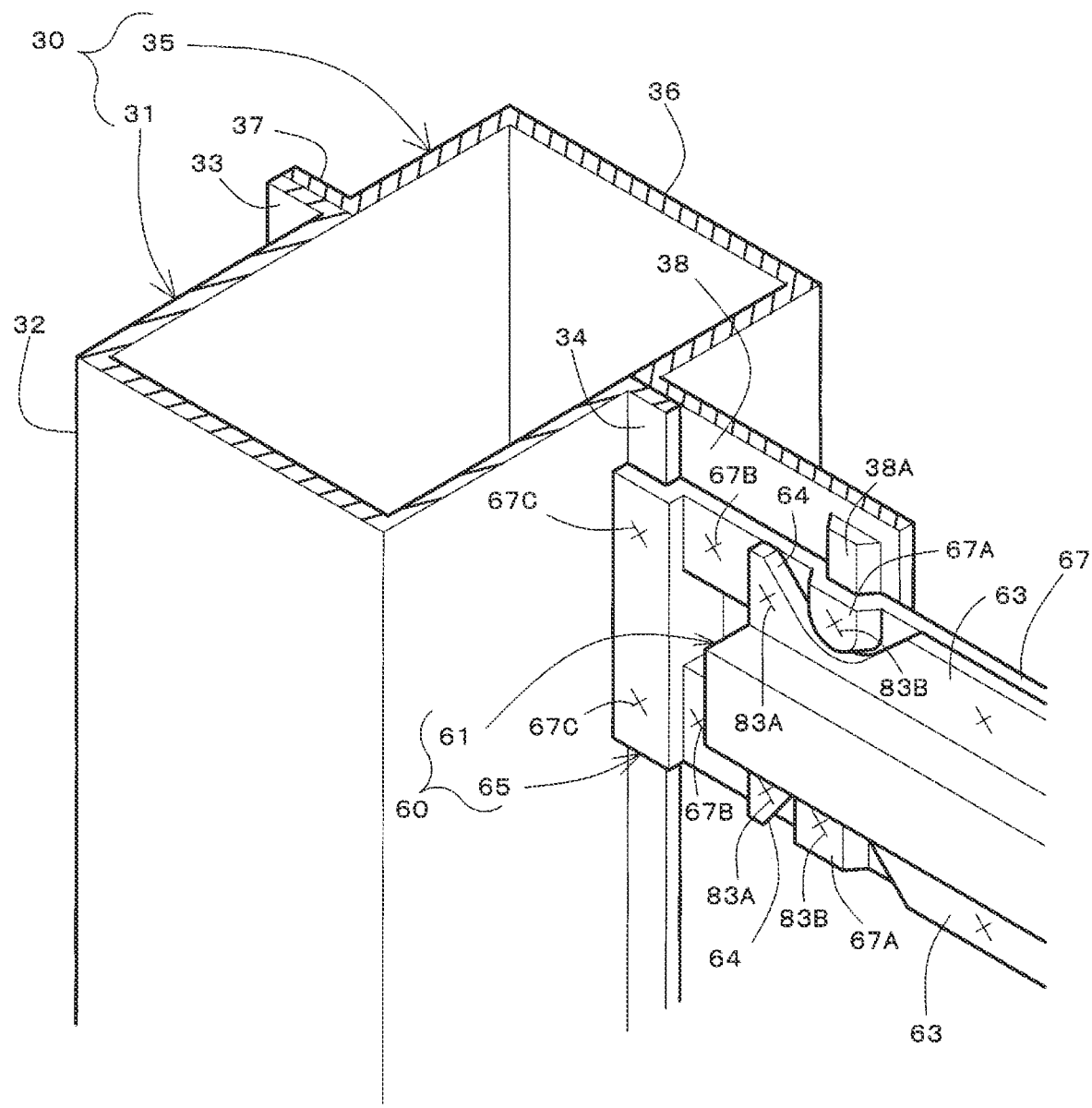
FIG. 6 is a perspective view illustrating the structure in FIG. 5 with a pillar bracket and the seat cross member being removed.

FIG. 6 illustrates the structure of FIG. 5 with the pillar bracket 80 and the seat cross member 70 being removed. In the following, while the structure in the vicinity of the B pillar 30 is described; the same description is also applicable to the structure in the vicinity of the C pillar 40 by adding 10 to each of the reference numerals.

Referring to FIGS. 2 and 5, the B pillar 30 has a closed sectional structure, and includes a pillar inner 31 and a pillar outer 35. The pillar inner 31 is disposed further inward with respect to the pillar outer 35 within the vehicle cabin and the pillar outer 35 is disposed further outward with respect to the pillar inner 31 within the vehicle cabin. The pillar inner 31 has a U-shape cross section and includes a body part 32 opened outward of the vehicle cabin and a pair of flanges 33 and 34 respectively extending along the vehicle length from opposite open ends of the body part 32.

Similarly, the pillar outer 35 has a U-shape cross section and includes a body part 36 opened inward of the vehicle cabin and a pair of flanges 37 and 38 respectively extending along the vehicle length from opposite open ends of the body part 36. The flange 38 of the pillar outer 35 adjacent to the window frame member 60 has a greater extending length along the vehicle length than the opposite flange 34 of the pillar inner 31.

The flange 34 and the flange 38 thus having different extending lengths result in different joining portions: a portion where the window frame member 60 is joined to both the flange 34 and the flange 38 and a portion where the window frame member 60 is joined only to the flange 38.

Four-lap welding of the flanges 34 and 38, the flange 63 of the inner window frame member 61, and the flange 67 of the outer window frame member 65 becomes difficult when the thicknesses of the flange 34 and flanges 38 is great. In the present embodiment, the window frame member 60 can be joined to the B pillar 30 by three-lap welding of the flange 38, the flange 63 of the inner window frame member 61, and the flange 67 of the outer window frame member 65.

As described above, the window frame member 60 includes the inner window frame member 61 and the outer window frame member 65. Referring to FIG. 6, the outer window frame member 65 is configured to be longer than the inner window frame member 61 along the vehicle length. Therefore, the front and rear ends of the flange 67 of the outer window frame member 65 are joined to both the flange 34 of the pillar inner 31 and the flange 38 of the pillar outer 35, whereas the flange 63 of the inner window frame member 61 terminates before the flange 34 of the pillar inner 31. The flange 63 of the inner window frame member 61 is therefore joined only to the flange 38 of the pillar outer 35.

The flange 63 of the inner window frame member 61 includes a notch 64. The flange 67 of the outer window frame member 65 includes a protruding bearing surface 67A corresponding to the notched region. The flange 38 of the pillar outer 35 may also include a protruding bearing surface 38A to be superposed on the bearing surface 67A.

Referring to FIGS. 5 and 6, the bearing surfaces 67A and 38A, and a second flange 83 of the pillar bracket 80 include a welding point 83B where the bearing surfaces 67A and 38A, and the second flange 83 of the pillar bracket 80 are superposed on each other and welded by three-lap welding. These members further include, adjacent to the welding point 83B, a welding point 83A where the flange 63 of the inner window frame member 61, the flange 67 of the outer window frame member 65, the flange 38 of the pillar outer 35, and the second flange 83 of the pillar bracket 80 are superposed on each other and welded by four-lap welding.

Further, the front end of the flange 67 of the outer window frame member 65 is superposed on the flange 38 of the pillar outer 35 at a welding point 67B. The flange 67 is further superposed on the flange 38 of the pillar outer 35 and the flange 34 of the pillar inner 31 at a welding point 67C.

Referring to FIG. 5, the pillar bracket 80 secures the seat cross member 70 to the B pillar 30 (first pillar), and includes a storage slot 81, a first flange 82, and the second flange 83.

The first flange 82 is attached to a vehicle cabin wall 32A of the body part 32 of the pillar inner 31, and is coupled to the vehicle cabin wall 32A with a bolt and a nut. In a configuration including a welding electrode inserted in a hollow portion of the B pillar 30, the first flange 82 and the body part 32 of the pillar inner 31 are coupled by welding, in place of coupling using a bolt and a nut.

The second flange 83 is connected to an end portion of the first flange 82 and extends along a side wall 32B of the pillar inner 31 and the flange 38 of the pillar outer 35. As described above, the second flange 83 includes the welding point 83A where the second flange 83 is superposed on the flange 63 of the inner window frame member 61, the flange 67 of the outer window frame member 65, and the flange 38 of the pillar outer 35. The second flange 83 further includes the welding point 83B where the second flange 83 is superposed on the flange 67 of the outer window frame member 65 and the flange 38 of the pillar outer 35.

Figure 7:
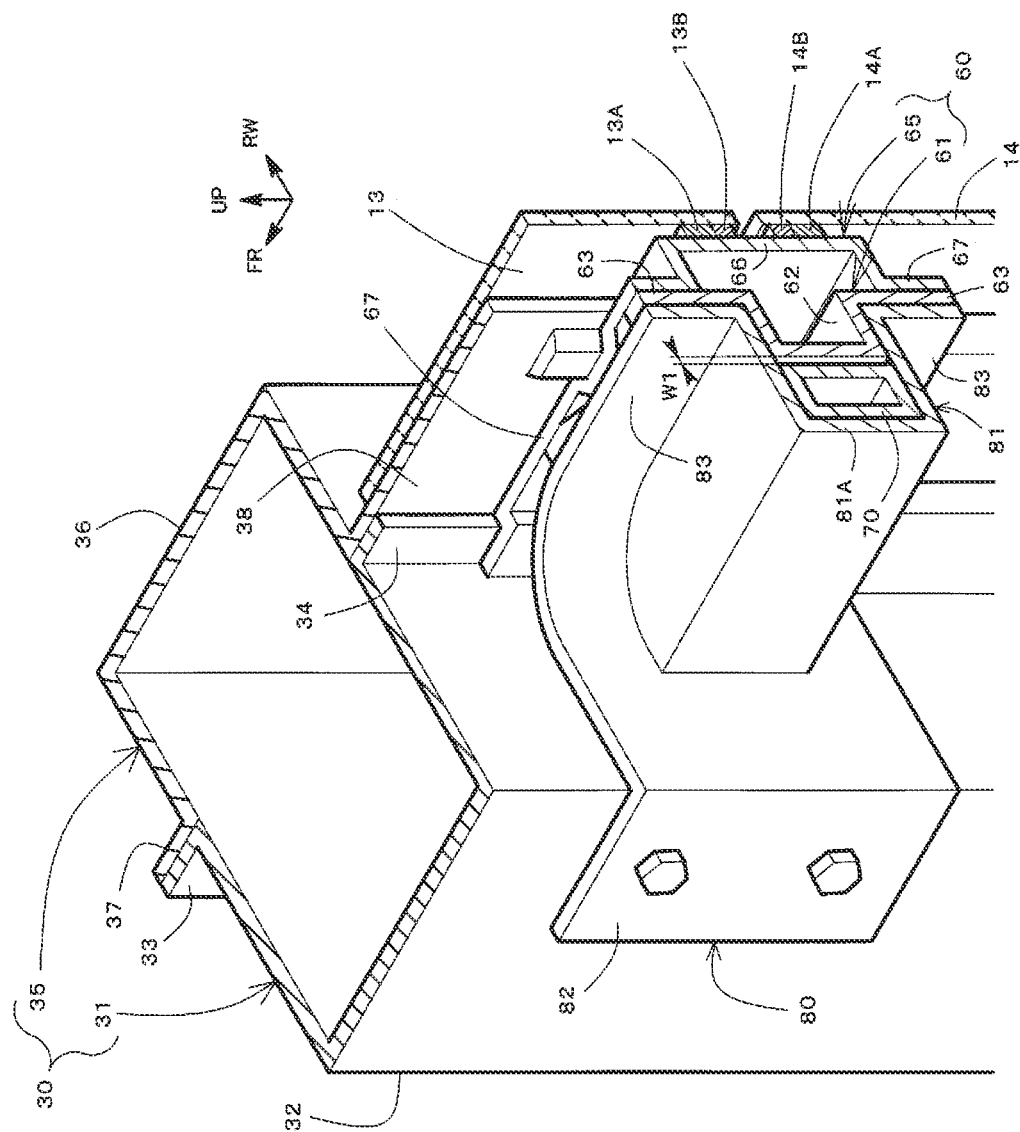
FIG. 7 is a perspective cross sectional view taken along A-A in FIG. 2.

Referring to FIGS. 7 and 8, the storage slot 81 is a rectangular recess having a U-shape cross section, and is opened outward of the vehicle in the vehicle width direction. The pair of second flanges 83, 83 extend upward and downward, respectively, from the respective open ends of the storage slot 81.

The storage slot 81 stores the seat cross member 70 having a rectangular pipe shape and the body part 62 of the inner window frame member 61. The seat cross member 70 is inserted into the storage slot 81 until the seat cross member 70 comes into contact with the bottom plate 81A of the storage slot 81. The seat cross member 70 and storage slot 81 in this state are fixed to each other by arc welding, for example.

The body part 62 of the inner window frame member 61 is further inserted into the storage slot 81. The open ends of the storage slot 81 are in contact with the flange 63 of the inner window frame member 61.

As illustrated in FIG. 8, the depth W2 of the storage slot 81 is greater than the sum of the length W3 of the seat cross member 70 along the vehicle width and the length W4 of the body part 62 of the inner window frame member 61 along the vehicle width (W2>W3+W4). As described above, the seat cross member 70 is inserted into the storage slot 81 until the seat cross member 70 comes into contact with the bottom plate 81A of the storage slot 81, and the body part 62 is inserted into the storage slot 81 until the flanges 63 come into contact with the open ends of the storage slot 81. This creates a horizontal or vehicle widthwise gap W1 between the seat cross member 70 and the body part 62 within the storage slot 81. The gap W1 has a dimension that is equal to that obtained by subtracting, from the depth W2 of the storage slot 81, the sum of the length W3 of the seat cross member 70 along the vehicle width and the length W4 of the body part 62 of the inner window frame member 61 along the vehicle length (W1=W2−(W3+W4)).

As described above, the pillar bracket 80 stores the seat cross member 70 and the window frame member 60 spaced apart from each other along the vehicle width or horizontal direction, allowing the seat cross member 70 and the window frame member 60 to be spaced apart from each other along the vehicle width or horizontal direction over their entire lengths, as illustrated in FIGS. 8 and 9.

The gap W1 or a spacing width may be between 1 mm and 10 mm, for example. The pillar bracket 80 may be produced by pressing, for example. It is well known that the accuracy of pressing can be set in units of 0.1 mm or less. This accuracy enables adjustment of the gap W1 at high precision during production of the pillar bracket 80.

While in the above example, the vehicle cabin partition structure according to the present embodiment is applied to the side structure of the vehicle cabin, the vehicle cabin partition structure according to the present embodiment is not limited to this example.

For example, the vehicle cabin partition structure may include a window panel (an upper window panel and a lower window panel) disposed on a part of the rear wall of the vehicle cabin, and a seat having a rear surface facing this window panel. The vehicle cabin partition structure may further include a window frame member that supports the window panel and a seat cross member that supports the seat. Opposite ends of each the window frame member and the seat cross member are coupled to a pair of pillars, respectively, spaced apart along the vehicle width.

The present disclosure is not limited to the embodiments described above, and includes all changes and modifications without departing from the technical scope or the essence of the present disclosure defined by the claims.

The invention claimed is:

1. A vehicle cabin partition structure, comprising:
   a window panel standing vertically to be part of a partition that separates inside and outside of a vehicle cabin;
   a window frame member configured to support the window panel;
   a seat disposed within the vehicle cabin and having a rear surface facing the window panel; and
   a seat cross member that is a frame member configured to support the seat, wherein
   the window panel comprises an upper window panel and a lower window panel disposed below the upper window panel,
   the window frame member has a horizontal bar shape, disposed between the upper window panel and the lower window panel and configured to support a lower end of the upper window panel and an upper end of the lower window panel, the window frame member having opposite longitudinal ends fixed to a first pillar and a second pillar adjacent to the first pillar, respectively, the first pillar and the second pillar being vertical pillars in the vehicle cabin, the seat cross member has opposite longitudinal ends fixed to the first pillar and the second pillar, respectively, and the window frame member and the seat cross member at least partially overlap each other in a portion along a vehicle height, and the window frame member and the seat cross member extend with a horizontal gap disposed between the window frame member and the seat cross member over entire lengths of the window frame member and the seat cross member, the horizontal gap being less than a horizontal width of the window frame member and a horizontal width of the seat cross member.

2. The vehicle cabin partition structure according to claim 1, wherein the opposite ends of the window frame member are directly fixed to the first pillar and the second pillar, and the opposite ends of the seat cross member are fixed to the first pillar and the second pillar via a bracket.

3. The vehicle cabin partition structure according to claim 2, wherein the window frame member and the seat cross member are disposed in sequence from the window panel toward inward of the vehicle cabin, the window frame member comprises an outer window frame member and an inner window frame member, the outer window frame member being disposed further outward relative to the inner window frame member within the vehicle cabin and the inner window frame member being disposed further inward relative to the outer window frame member within the vehicle cabin, the inner window frame member has a hat-shape cross section and comprises a body part having a U-shape cross section and opened outward of the vehicle cabin and a pair of flanges extending upward and downward, respectively, from open ends of the body part, the seat cross member has a rectangular pipe shape, the bracket has a U-shape cross section and is opened outward of the vehicle cabin, the bracket comprising a storage slot configured to receive, from inward of the vehicle cabin, the seat cross member and the body part of the inner window frame member, the storage slot having open ends in contact with the pair of flanges of the inner window frame member, respectively, and the storage slot has a slot depth that is greater than a sum of the horizontal width of the seat cross member and the horizontal width of the body part of the inner window frame member.

* * * * *